United States Patent [19]

Wiczer

[11] 4,010,308

[45] Mar. 1, 1977

[54] FILLED POROUS COATED FIBER

[76] Inventor: Sol B. Wiczer, 1600 S. Eads St., Arlington, Va. 22202

[22] Filed: June 9, 1975

[21] Appl. No.: 584,934

Related U.S. Application Data

[63] Continuation-in-part of Ser. No. 871,747, July 11, 1969, Pat. No. 3,889,038, which is a continuation of Ser. No. 515,806, Dec. 21, 1965, abandoned, which is a continuation-in-part of Ser. No. 157,591, Dec. 6, 1961, Pat. No. 3,278,328, which is a continuation-in-part of Ser. No. 777,344, Dec. 1, 1958, abandoned, which is a continuation-in-part of Ser. No. 353,003, May 4, 1953, Pat. No. 2,862,284.

[52] U.S. Cl. .......................... 428/372; 15/159 A; 428/375; 428/376; 428/379; 428/381; 428/383; 428/389; 428/397; 428/398; 429/127; 429/135

[51] Int. Cl.² .................. A46B 1/00; B32B 15/00; D02G 3/00

[58] Field of Search .......... 428/397, 398, 375, 378, 428/400, 372, 376, 394, 383, 379, 389, 381; 15/159 A, 159 R; 429/127, 133, 135

[56] References Cited

UNITED STATES PATENTS

| | | | |
|---|---|---|---|
| 2,200,946 | 5/1940 | Block | 428/394 |
| 3,461,197 | 8/1969 | Lemelson | 264/172 |
| 3,463,652 | 8/1969 | Whitsel et al. | 428/394 |
| 3,551,280 | 12/1970 | Kippan | 428/394 |
| 3,723,240 | 3/1973 | Skochdopole | 428/398 |
| 3,785,919 | 1/1974 | Hickman | 428/398 |
| 3,836,616 | 9/1974 | Kobashi | 428/376 |

Primary Examiner—Lorraine T. Kendell

[57] ABSTRACT

A foam coated fiber core, the outer pores thereof being filled with substance of a solid, liquid of pressurized gaseous character in which the foamy coating acts as a carrier therefor, and in which the filler enhances the utility of the structure for many uses, such as uses of the fiber per se or as a carrier or dispenser of the added substance being carried therein.

11 Claims, 3 Drawing Figures

FILLED POROUS COATED FIBER

This invention is a continuation in part of my copending application, Ser. No. 871,747 filed July 11, 1969 now U.S. Pat. No. 3,889,038, and in turn a continuation application of my copending application Ser. No. 515,806, filed Dec. 21, 1965, now abandoned, in turn a continuation-in-part of my copending application Ser. No. 157,591, filed Dec. 6, 1961, now U.S. Pat. No. 3,278,328, issued Oct. 11, 1966, in turn a continuation-in-part of my copending application Ser. No. 777,344, filed Dec. 1, 1958 now abandoned, in turn a continuation-in-part of my copending application, Ser. No. 353,003, filed May 4, 1953, now U.S. Pat. No. 2,862,284 issued Dec. 2, 1958, and relates to a coated filament in which a core material has a foamed plastic coating thereon, said coating, according to the present invention, being filled with a solid, liquid or pressurized gas, substantially to enhance the utility of the porous coated filament.

In one aspect of this invention, the filling of the pores with a gas under pressure enhances the utility of the filament, variable in its application and with the nature of the gas. The highly porous filament is highly absorptive and thereby will occlude larger quantities of gas under pressure than ordinary filaments are capable of when the applied pressure is released. For instance, the filaments may be filled loosely or packed into a container having pressure resistant walls in which commercial gases are stored under pressure and the foamed filament coating will allow absorption of larger quantitites of the gas. Such gases may be any gas of commerce sold in pressurized containers, typically oxidizing gases such as oxygen or nitrous oxide, reducing gases such as hydrogen, carbon monoxide, hydrocarbon gas such as methane, ethane, butane acetylene, ethylene, or inert gases such as helium, nitrogen, freon, carbon dioxide or evenly highly reactive gases such as chlorine, and hydrochloric acid, hydrofluoric acid, boron fluoride, hydro cyanic acid or the like.

The gas can also be impregnated throughout the porous coating of the fiber under low pressure to 5 to 10 psig, and will be evolved according to its character, inert, oxidizing, reducing or the like, slowly down to atmospheric pressure, and serve that kind of useful purpose for the fiber according to the nature of the gas. For example, porous fibers can be used as a packing material for mechanical insulation for protection of perishable goods for shipment and evolving an inert gas such as nitrogen, ethylene or carbon dioxide to supply a reducing or inert atmosphere tending to render the container and its contents, including surrounding areas near the container from which the gas may slowly leak, relatively inert and fireproof or make the container and its contents relatively non-combustible.

For instance, the fiber filled with ethylene gas or other hydrocarbon gas can be used as a protective packing material for shipment of bananas in which they are surrounded, padded or encased, and green bananas will tend under the influence of the gas and packing, not only to be safely shipped, well packed without damage, but will enhance the ripening rate of bananas.

Again, the inert gas filled fiber may be used as an upholstery filing such as for automobile seats and other vehicles, and being impregnated with an inert gas, such as nitrogen, carbon dioxide, will render the filler relatively fireproof in contrast to other gases.

The filler can be used for a packing material for machined metal parts for storage or shipment and may also be used in combination with other substances tending to impart a rust-proof characteristic to such parts stored and, variable with the character of the metal, the gas can be of any nature, corresponding that is, it can be oxidizing, reducing or inert. The gas can also be active insecticidal or repellent, disinfectant in character, such as chlorine gas or it may be a low vaporizable liquid such as formaldehyde or phenol as to evolve a vapor having a disinfectant, perfuming, odorizing or other beneficial effect impregnated in the porous body of the porous covered fiber. For instance, the fiber impregnated with formaldehyde, chlorine alone or combined with a liquid or solid insect repellent, such as pine oil or chlorinated terpenes, 2-4,D, DDT or the like, can be spread about the lawn of a household, golf course or the like to repel insects. Where the gas is reactive, the fiber impregnated therewith is contacted with other reagents in its use. For instance, fiber impregnated with hydrochloric acid or gaseous boron fluoride can be used as a contact surface upon which isobutylene will polymerize in liquid or gaseous state to form polyisobutylene.

In practicing this aspect of the invention, the fiber is placed in a container which may first be evacuated to remove at least some of the air that may have partially impregnated the fiber pores to some lower pressure, substantially less than atmospheric, such as about 1–20 or higher such as 150 mm Hg, and the impregnating gas is then passed into the container filled with the porous fiber, to a substantial pressure. Where the fiber is to be used as a filler for the container, the applied pressure can be several thousand pounds, i.e. 100 to 10,000 pounds. Where the fiber is to be used at substantially atmospheric pressure, the pressure of the supplied gas can be only a few pounds, 5–100 psig above atmospheric. The fiber then will be packaged or combined within relatively gas impermeable confining walls, at substantially atmospheric pressure. At atmospheric pressure the porosity of the fiber will generally retain most of the absorbed gas.

In the second aspect of this invention, the filler can be liquid, and in that respect the liquid and its carrier in combination will have an improved effect. For instance, the fiber can be filled with a liquid, such as liquid mineral oil and used as a packing material for bearings; or the liquid can be light as to evolve vapor such as a perfume or as mentioned, pine oil; or it might be an odor destroyer such as formaldehyde; or a general disinfectant, such as phenol, cresol, tar acids or the like and the impregnated porous fiber spread or rubbed around in areas that need disinfection. The impregnant can be a liquid detergent or soap such as ammonium lauryl sulfate or liquid polishing wax or oil, rust remover or the like in which a solvent oil such as glycerine carrier, a rust dissolving salt such as ammonium chloride acid and the thus impregnated fiber is useful to polish metal ware such as silverware. The liquids may be of another character depending on the intended use of the fiber, for instance, detergent for washing the floor; or the liquid can be an insecticide like pyrethrum dissolved in hexane as mentioned for discouraging insects.

The impregnating liquid can be tacky and form a pressure sensitive adhesive such as a tacky triethylene glycol solution of sorbitol, so that the fiber filled adhesive can be mounted upon tape and used as a reinforced adhesive tape.

The liquid can be a chemical used for a selected chemical function, such as an acid strip carrying such acids, usually diluted, as the typical mineral acids, sulfuric acid 20%, hydrochloric acid 10%, and phosphoric acid 10% or the like, and the fiber impregnated with such liquids being useful in scouring pads to remove rust or clean concrete surfaces or the like. The liquid can also be medicinal and for application absorbed in the fiber supported upon a bandage type tape carrying such liquid medicinals as tincture of iodine, disinfecting oils, detergent oils or the like. The liquid can also be water or a humectant such as a mixtue of glycerine and water, and the impregnated fiber distributed as needed in containers as a humidifying agent for closed spaces.

In applying the liquid to the fiber the dry porous fiber is dipped in the liquid, and the excess liquid reduced as needed, by mixing the dipped fiber with more untreated dry fiber, so that the liquid will tend to distribute itself throughout the core coated fibrous body. The excess liquid can also be brushed off, as shown below in the drawings. Where the excess liquid is light and easily volatilized it can be allowed to evaporate in air, and ultimately, the quantity of liquid will be reduced by drying in an air stream to whatever residual liquid content is desired.

Usually depending on the specific nature of the liquid, such as oil or liquid detergent, where the combined fiber and oil or detergent is to be used for lubrication or scouring or other typical uses, where the excess of liquid functions as well for the intended use, the fiber needs no more than to be wet with the liquid, whereby the total fiber surface is coated therewith, although most of it is absorbed in the pores, as a reservoir supply of the liquid so that the fiber serves as a better carrier for a larger quantity of liquid. In that condition, the excess liquid does not need to be removed.

In the third aspect of the invention, the impregnating substances may be various solids, such as solid soap, fireproofing agents, typically tetrabromo phthalic anhydride lubricant such as graphite, salts, pigment solids, insecticides, insect repellents, waxes, or mixed suspensions or solutions of solids in liquids, such as paints, etc.

The filler can be electro-conductive or insulating depending upon the use intended for the fiber. For instance, where the core material of the fiber is conductive, such as metal or graphite fiber, the filler can be copper oxide or maganese dioxide, tin oxide, and after applying such filler into the pores, a second coating of metal can be plated over the outside. Such fiber then is a primary cell, a battery. Such total plated filament length can be chopped or cut up into small parts and a dry cell type battery will result, requiring only completion of the circuit across the inner conductive core and outer conductive coating. Such coating can be achieved either by an electroless plate, electroplate, such as shown in U.S. Pat. No. 3,533,828, whereby a dry cell type battery is formed of miniscule size, having the total thickness of a porous coated filament, that is a filament core having a porous foamed plastic film thereon with the pores, filled with electro-conductive oxide or salt and a thin outer metal plate thereover. Such battery may be of any length, as long as the filament. The outer metal plated surface of such battery may be further insulated by an insulating coating of any character applied thereon, such as shellac solution in alcohol applied and dried thereon, and as an insulating outer third film, and the entire battery-like filament can be wound as a coil. The dry cell filament, per se, of course can be chopped into tiny miniscule sized lengths for any purpose for which a battery can be used.

Other useful coating solids with which the filament pores may be filled can include dry coloring components or dyeing agents to supply a pigment or color, completing and partially filling the porous surface to attractively color the filament. The color can be applied by dissolving a dye in a solvent, and wetting the filament therewith and then evaporating solvent; or the pigment may be a dry powder that is merely brushed or rubbed upon the porous filament surface, embedding the powdered pigment particles in the filament pores. Such attractively pigmented filaments may be tufted as a pile fabric, woven or matted, or merely spread around the surface of the ground like green grass as additional fibrous coloring material. The porous coated fibers may carry any other useful components in addition to the pigment, such as an insecticide repellent attractively perfumed or odoriforous substance impregnated in the pores. Such attractively colored fiber including such other component may be spread around the grass, such as a golf course green, park, yard, or the like, to maintain the green appearance while repelling or destroying insects or attractively odorizing the area with a useful scent, such as pyrethrum, pine oil, eucalyptus oil or other insect repellents attractively scented, such fiber being distributed strategically where the improved effect is useful. For instance, the green colored fiber further carrying a desirable odorizing or insect repellent substances can be assembled in a tufted pile type of fabric and used to cover all or portions of a playing field, such as a baseball diamond, football field or the like.

The porous fiber can also be impregnated with absorptive or adsorptive solids, such as bentonite, fullers earth, active charcoal, or the like and used as a filter aid for liquids or gases and the solids may include a coagulant such as alum. The solids may be detergent, acid or alkali or other chemical salt or oxide including inert abrasive powders for use as a cleaning or scouring pad.

Again, the solids may be of a catalytic nature or may be moisture absorbent such as silica gel, or active metals or metal oxides such as platinum or nickel or nickel or chromium oxide, whereby the fiber can be used as a contact surface over which gases are passed for reaction such as hydrogenation or merely for moisture absorbency to remove moisture from the air or other fluid. The catalyst of course can be an oxidizing type compound, typically vanadium pentoxide or chromic oxide, and usefully used in a muffler or the like over which hot gases may be passed for oxidation of unburned hydrocarbons, carbon monoxide or the like for exhaust gas purification or to catalyze other oxidation reactions typically oxidation of toluene or xylene to their corresponding aromatic acids.

For applying the solid to the fiber the solids need merely to be dusted or rubbed over the surface of the fiber preferably with additional brushing whereby the solids generally fill the pores. In any case, the porous surface of the fiber can be filled with a mixture of liquid and solid, the liquid serving as a carrier to improve the adhesion and impregnation of the fiber pores with the solids and mixtures with liquids.

The invention is further explained by reference to the drawings wherein.

Figure 1:
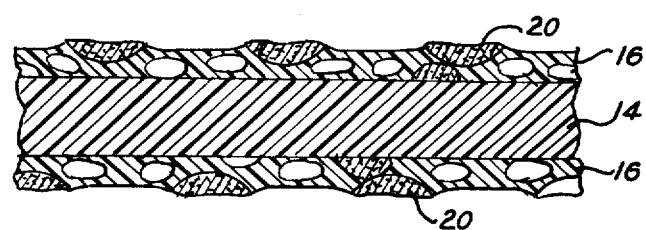
FIG. 1 shows a coated fiber in which at least the coating is porous having its surface interrupted by open pocks as described in my parent application.

As shown in FIG. 1 the core of the fiber may be any of the core materials as listed in my prior application, herein incorporated by reference, such as organic or inorganic fiber of any character, such as graphite, boron, cotton or extruded plastic fibers such as glass, polyester, polyamide (nylon), polyacrylate or the like. The coating material is a foamable plastic comprising a film-forming polymer which usually is dissolved in a solvent or fused as a coating upon the core fiber where the polymeric coating is thermoplastic. Such coating materials may be cellulosic, such as cellulose acetate, cellulose nitrate, polystyrene, polymethyl meghacrylate, polyvinyl chloride, polyvinyl acetal, polyepoxy and the like.

The coating can also be thermosetting, passing through a fused or liquid state when heated to set. The kind of thermosetting polymer may be phenol formaldehyde, methanal formaldehyde which sets with heat or sets with a catalyst such as an epoxy resin. A blowing agent is incorporated in the polymerizable mixture which will be activated with heat when the mixture is to be set and convert the coating on the fiber to porous form as described in my parent application.

The coated fiber is then passed through a solvent, swelling or softening bath, such as one containing a partial solvent for the coating where it is thermoplastic. For instance, a polystyrene coating core may be passed through a petroleum ether bath, typically of mixed pentanes and the partial solvent is absorbed in the plastic coating on the fiber. Thereafter, some of the solvent is imperically dried from the surface of the filament but much remains trapped in polymeric coating. Thereafer, upon heating to a moderate temperature, such as 100°–200° C, more or less depending upon the characteristic of the fiber and coating material, the coating will soften, the trapped petroleum gas pentane will expand as a blowing agent and thus convert the polymeric coating to a porous surface including open pocks. Other gas-forming blowing agents may be incorporated into the soft polymer coating applied to the fiber, and these may be activated to convert the softened coating to a porous coating as described above and in my parent application. The fiber with or without further reduction to desired lengths, is then filled with gas, liquid or solid as described.

Figure 3:
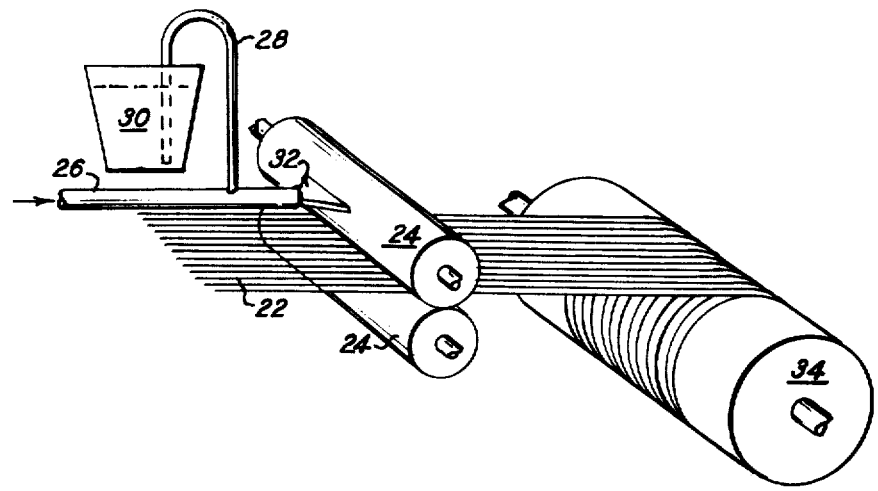
FIG. 3 illustrates a manner of filling the pores of the fiber.

As shown in FIG. 1 the fiber 10 has a core 14 and a porous coating 16, it will be filled with a gas, liquid or solid in each open pock 20, as described above. For filling the porous surface of the fibers, several running lengths of fiber 22 as shown in FIG. 3 are passed through the nip of tangential rollers 24, which may run at the same speed, but preferably, one of the rollers 24 will operate at a much higher speed to impart a rubbing effect upon the fibers passed therethrough. Simultaneously, solids in a container 30 are sucked up into a duct 28 by a stream of gas passed through a duct 26 and emitted as a dust-like suspension through a nozzle 32, played against the surface of one of the rollers 24 for supplying the dust for rubbing into the porous fiber 22. In this manner a solid coating or a suspension of solids in gas may be supplied. Alternately the same coating device may be used for spraying a liquid coating upon the surface of the fiber which will be rubbed in by the follers. These rollers 24 may have a felt or brush-like surface to apply a brushing as well as rubbing effect to the fiber surfaces.

The highly porous fiber has the unique property of absorbing larger quantities of gas and liquids as well as solids, since the pores themselves will provide space in much greater volume than would be available from the simple surface of the fiber. Consequently, the porous fiber coated with a thermoplastic coating as disclosed here and in my parent application, can be matted into a porous fiber body and then heated sufficient to cohere the thermoplastic coating, bonding together several fibers into a porous body, without destroying the internal porosity of the matted fiber. That is, the fiber will merely be heated enough to form a porous sponge-like body by cohesion at numerous points of the thermoplastic coating. For this purpose the assembled matted fiber packed into a container, a mold, will be heated to the softening point of the thermoplastic coating upon the fiber with the heating being controlled to the softening point of the particular thermoplastic used. That porous body can then be impregnated as desired with materials that are useful in a sponge, such as detergent, cleaning fluids or the like, or it may be distributed unfilled for actual filling by the user.

In another application of the highly absorptive porous fiber, a group or batch of fibers may be assembled, aligned and into parallel running lengths and then secured together at one end, as a porous-like fiber structure, typically, by bonding the fibers at only one end of the fibers, and attaching that bonded end to a holder, such as a brush-handle or stick, and the loose end of the fiber can be pared evenly as a brush for such use. While that brush would have great utility as a dry bush, because it is absorptive and can be used for cleaning, scrubbing or actual brushing operating, its highly absorptive character also allows its use as a paint brush. It can carry brushable liquids or can be dipped into a paint liquid for distribution. That kind of brush can carry greater quantities of liquid such as paint or be used over longer periods, or will secure an equivalent amount of liquid used in an ordinary brush without tending to drip paint, and will feed the absorbed paint for a brush-type coating evenly or a surface for improved transfer thereto of the absorbed fluid.

Figure 2:
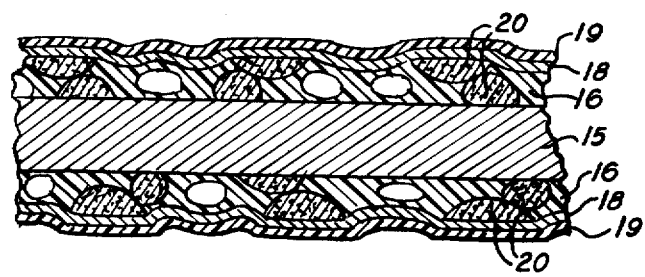
FIG. 2 shows a fiber in which the core is conductive, such as metal coated with an electrolyte filler in the pores, super-coated with a metal film and finally carrying an insulating coating on the outside.

As shown in FIG. 2 the core of the fiber 15 is conductive such as graphite or metal, and the foam coating 16 is filled with a conductive salt or oxide 20 of the type used in a dry cell. The core could be cadmium and the filler cadmium oxide or chloride, is conductive from the inner core outward to the porous surface. This outer surface is then coated over with a thin conductive sheet such as another metal 18 such as tin, lead or copper and an outer coating of shellac 19 is finally applied as insulation.

The following examples illustrate the practice of this invention.

EXAMPLE I

Continuous running lengths of extruded glass filament are severally passed through a bath of 10% polystyrene solution in toluene, the solvent is evaporated from the continuous running lengths of filament and the hard polystyrene coating glass is then passed through a second bath of liquid n-pentane at a rate to provide a contact time for the plastic coated filament in the pentane solvent of at least five minutes, whereby the n-pentane is absorbed in the polystyrene coating. The filament is then passed through a heated tube maintained at a temperature of about 150° C whereby the polystyrene coating is converted to a foam. The foam coated filament is then passed slowly at a rate of 2 linear feet per minutes through the nips of a series of tangential rolls together with a spray of finely divided carbon black as shown in FIG. 2, which rubs the powder into the porous surface. For effective filling of the pores by rubbing one of the rolls is rotated at substantially higher than the other, such as periferal speed of about 300 inches per second, the companion roll moves only slowly at about 10 rpm, whereby the filament achieves a black coating of carbon black and the pores in the coating are substantially filled. Thereafter, the filament is chopped into useful lengths, either short lengths of about 1 inch, or a mixture of various lengths ranging from ¼ to 2 inches; or it can be used as a continuous running lengths, wound in a coil as shown in FIG. 2 depending upon its purpose of use as a coated filament. In this example the various other pigments or solid powders may be substituted as desired, such as titanium dioxide to produce a white color, Cds. CdSe $BaSO_4$ for a red color, ferroso ferricyanide for a green color and ferrous ferricyanide for a blue color, and the like. Moreover, the pigment powders can be mixed with other useful solids having one of the function listed above. For instance an insecticide, typically pyrethrum or another component can be a liquid such as pine oil, or eucalyptus oil, either have a useful scenting effect. Moreover, the periferal speed of one of the rolls may be varied in the range of about 200 to 1500 ft per minute and the fiber can be passed through the rolls at a rate in the range of 0.1 to 100 ft per minute.

EXAMPLE II

The pores of the fiber as formed in Example 1 are filled with DDT in finely powdered or small crystalline form by brushing into the pores of the coated filament, and such filler may similarly be pignmented simultaneously, such as colored green by a mixture of DDT with a green pigment, and the ultimate filament is chopped into short lengths of about two inches and distributed about the grass as grass appearing filament having an insecticide effect.

EXAMPLE III

The filament as formed in Example I may be graphite, substituted for the carbon black, and the fiber chopped into short lengths may be matted or spun into a yarn, and used as a packing material. The graphite may be modified by impregnating the pores also with a wax such as tallow, paraffin, beeswax, carnauba wax or the like, and the wax-graphite mixture can be rubbed into the pores of the filament, and the thus treated filament is then used in matted form or spun into a yarn or even molded into a useful shape, such as pressing into an 0-ring for use as a seal or packing.

EXAMPLE IV

Short lengths of cotton linters are wet with a 10% solution of co-polymer of polystyrene and acrylonitrile in about equal proportions dissolved in benzene. The solvent is evaporated in an air stream, and the coated cotton fiber is then dipped for a period of 30 minutes in mixed pentanes (petroleum ether) and again dried. The product is finally stirred in boiling water whereby the coating foams, is then centrifuged dried and again dried in an air stream in a temperature below about 50° C. The product is then mixed with diatomaceous earth as a dry powder. The dry porous fiber and diatomaceous earth are dry mixed in a mixing bowl having a high speed rotary blade rotated at 350 inches per second, tip speed. The excess powder is dusted off and the coated fiber is then used as a filter aid, matting the short fiber lengths upon support such as a porous screen, forming a filtered cake thereon, and a liquid such as a stream of water is passed therethrough and is substantially purified by passing through the matted cake, which serves to remove suspended solids as well as impurities from the water.

EXAMPLE V

The coated fiber of Example IV before filling, is filled loosely in a container, as a shape comprising foamed thermoplastic coated loose matted fiber in short lengths of about three-quarters inches. The matted mass is warmed with steam passed therethrough and the foamed coating softens, and surface contact points of the fiber cohere. Thereafter, the product is cooled but securely retains its shape as a matted fibrous spongy body. It may be filled with water or solvent and used as a scouring pad as such, but preferably is filled with a detergent liquid or other useful liquid such as lubricating oil to form a lubricating packing.

EXAMPLE VI

The fiber of Example 1 may be dusted with a fire retardant powder typically tetrabromo phthalic anhydride, matted together as loose fiber and used as an upholstery filling.

EXAMPLE VII

The porous fiber of Example IV aerated with ethylene gas under about 10 p.s.i.g. and used as a packing case filler sealed in cases with green bananas.

EXAMPLE VIII

The filament of carbon, is coated as in Example 1 with a foam coating of polystyrene. The pores are then filled with a paste consisting of a mixture of equal parts manganese dioxide and carbon wet with an aqueous saturated solution of ammonium chloride and zinc chloride. The paste is applied by rubbing into the surface of the fiber as it is passed through tangential rolls. Thereafter, the coating of the fiber is electro-plated with zinc using the fiber as the cathode, using a zinc chloride bath with metallic zinc anode at a voltage of 1.5 and a current of about 0.1 ampheres. The electroplated filament is then passed through a water washing bath, dried in air and then coated with a 10% shellac solution in ethanol. The ethanol being evaporated in air and the coated filament wound in a coil. The thus formed filament is useful as miniscule sized battery in any selected length.

EXAMPLE IX

The filament as formed in Example IV has its foamy coating filled with formaldehyde and used as a disinfectant pad, small bits of matted fiber can be placed in a jar for the destruction of insects or similar purposes. In the same manner, other useful solvents may be substituted for the formaldehyde, typically, carbon tetrachloride or chloroform as a cleaning solvent. Perfumes or scented oils as odorizing liquids and the like.

EXAMPLE X

The fiber of Example IV is soaked in heavy lubricating oil having a viscosity of about 125 ssu at 210° F. The matted fiber soaked in lubricating oil is used as a packing lubricant for railroad car wheels for placement in stuffing boxes. Alternately other lubricating oils including liquid polyisobutylene of similar selected viscosity may be substituted for the mineral lubricating oil of the example.

EXAMPLE XI

The fiber of Example 1 is coated with an intermediately polymerized phenol-formaldehyde polymer powdered and mixed with a blowing agent, typically phenyl azoethyl sulfone in a quantity of about 2 weight percent based on the polymer, the dry powdery mixture is wet with concentrated formaldehyde, coated on the glass fiber, and passed through a heated tube at a temperature of 190° C to simultaneously activate the blowing agent, evaporate the formaldehyde, and set the phenol-aldehyde polymer as a foamy coating on the glass core. The thermoset foamy coating is then filled with a powderly mixture of chromic oxide mixed with about 10% ceric oxide. The filament is then cut in one-inch lengths, and is matted into a packing for exhaust gas mufflers as a catalytic active filler for treatment thereof.

EXAMPLE XII

The filament of Example 1 is cut into short lengths before filling, assembled in tufts as a brush and one end heated about the softening point of the coating, whereby the filaments are cohered only at the one end forming a tuft of a brush. The ends are trimmed and tapered as a brush, and then assembled to a carrier member. Thereafter, the porous coated brush is used for brushing with improved paint carrier properties.

EXAMPLE XIII

A filament comprising continuous running lengths of hemp, are foam coated as in Example III of my prior patent 2,862,284, to apply a foamed cellulose coating from a bath of alkaline viscose solution. The foamy cellulose coating after drying, is filled with a dry powdered mixture of equal proportions of calcium superphosphate and potassium nitrate as a dry powdered mixture as in Example VI. The fiber is cut into select lengths ranging from about ¼ to ¾ inches and comprise a useful fertilizer carrier as such. It may be mixed with dry peat moss and dried clay such as bentonite or other good dry soil components and sold as a potting soil or fertilizer in which the total lime and phosphate carried by the fiber in the mix, is about 1 to 5%.

EXAMPLE XIV

Cotton linters foam coated as described in Example IV, is filled with the dry powdered fertilizer mixture of Example XIII, and the loosely matted fibers in similar short lengths are molded into sheets of about ¼ to ⅜ inches thick as fine foamy matted product by heating the matted fiber with steam as packed loosely in a mold, to a temperature sufficient to soften and cohere the polystyrene coating upon the surfaces. The sheets are then used as a wrapping for seedlings usually with additional soil filler as described in Example XIII for shipment, storage or planting of the seedlings. The matted fiber can be molded into small flower pots or other useful shapes for planting so that the planted seedlings do not have to be transplanted but can be sold and handled as well as planted wrapped in matted fiber forms. In a modification of the present method the foamed shaped and matted fiber without filler before use can be merely wet with a fertilizer solution, such as dilute ammonia or nitrate solution containing from about 0.25 to 0.5% of the fertilizer chemical dissolved in water.

Other modifications will occur to those skilled in the art. Accordingly, it is intended that the examples and description herein be regarded as illustrative and not limited except as defined in the claims.

I claim:
1. A fiber comprising a fibrous core substance having a foamed coating thereon selected from the group consisting of thermoplastic and thermo-setting resins, the foamy surface being interrupted with open pores of said foam, at least said open pores being filled with a member of the group consisting of a gas applied under pressure, a liquid, solid particles and mixtures thereof.
2. The coated fiber as defined in claim 1 wherein said gas is a reducing gas selected from the group consisting of hydrogen, methane, ethane, propane, butane, actylene, ethylene, propylene, butylene and carbon monoxide.
3. The coated fiber as defined in claim 1 wherein the gas is an oxidizing gas selected from the group consisting of oxygen, oxides of nitrogen and halogen gases.
4. The coated fiber as defined in claim 1 wherein the gas is a reactive gas of the group consisting of halogen acids, ammonia and boron fluoride.
5. The coated fiber as defined in claim 1 wherein the gas is substantially inert and is selected from the group consisting of carbon dioxide, nitrogen, fluoromethane, difluoromethane and helium.
6. The coated fiber as defined in claim 1 wherein the fiber pores are filled with solids of the group consisting of pigments, insecticides, fireproofing agents, catalysts, electro-conductive substances, detergents, absorbents, lubricants, filter aids and fertilizers.
7. The coated fiber as defined in claim 1 wherein the liquid is a member of the group consisting of a solvent, an insecticide, a lubricant, perfuming agent, detergent, a moisture absorbing agent, a humectant, solutions and mixtures thereof with solids.
8. The coated fiber as defined in claim 1 wherein the core material is a member of the group consisting of natural fiber, solid organic fiber, carbon fiber, metal wire, and synthetic inorganic fiber.
9. A matted and cohered integrally porous spongy body comprising the filled foam-coated fibers of claim 1.
10. The coated fiber as defined in claim 1 wherein said core material is electro-conductive, the pores of said coating are filled with an electrolyte in electro-conductive contact with said core and with the outer surface of said foamed coating and an outer coating of a metal having a different electro chemical activity than said core is plated over the filler foam in electro-conductive contact with said electrolyte filling thereby forming an electrolytic cell between said core and plating.
11. A brush comprising tufts of substantially parallel filled foam-coated fibers as defined in claim 1.

* * * * *